R. H. WAPPLER.
HIGH TENSION ROTARY RECTIFIER.
APPLICATION FILED MAY 29, 1918.

1,320,106.

Patented Oct. 28, 1919.

Inventor
Reinhold H. Wappler
By his Attorney
Walton Harrison

UNITED STATES PATENT OFFICE.

REINHOLD H. WAPPLER, OF YONKERS, NEW YORK, ASSIGNOR TO WAPPLER ELECTRIC COMPANY, INC., A CORPORATION OF NEW YORK.

HIGH-TENSION ROTARY RECTIFIER.

1,320,106.  Specification of Letters Patent.  Patented Oct. 28, 1919.

Application filed May 29, 1918. Serial No. 237,352.

*To all whom it may concern:*

Be it known that I, REINHOLD H. WAPPLER, a citizen of the United States, residing at Yonkers, in the county of Westchester and State of New York, have invented certain new and useful Improvements in High-Tension Rotary Rectifiers, of which the following is a full, clear, and exact description.

My invention relates to high tension rotary rectifiers, of a kind suitable for use in connection with a synchronous motor and a high tension transformer, and employed under conditions where currents of unitary direction and small amperage are to be made from alternating currents.

My invention has a wide range of utility, and is specially adapted for X-ray work in connection with alternating currents of the kind commonly used in cities for heating, lighting, power and the like.

I seek to give my rectifier such form as to accomplish the following objects, among others:

I. To enable the commutator mechanism and parts immediately associated therewith to be operated in an insulating liquid, such as oil, and yet readily accessible to the operator.

II. To so construct and arrange the commutator mechanism that various rotary parts thereof, operating in the oil, tend to develop a minimum of friction in consequence of their motions relatively to the oil.

III. To give each commutator arm the form of a thin blade, so that in rotating it easily cuts its way through the insulating material and thus avoids undue waste of power.

IV. To enable various working parts, and the motor for driving the same, to be given comparatively small dimensions in consequence of the saving of power otherwise lost in friction against the liquid insulating material.

V. To so construct and arrange the commutator mechanism that it can be operated by a synchronous motor of relatively slow speed, and having preferably six or eight poles.

VI. To provide simple mechanism for adjusting the phase relation between the commutator mechanism and the synchronous motor.

VII. To so distribute and arrange the various parts, relatively to each other, as to improve the insulation.

VIII. To so shape the various parts that they may be readily made from standard stock, and with a minimum of alteration.

IX. To enable the commutator mechanism and the synchronous motor associated therewith to be bodily removed and replaced, as a connected group of mechanism.

X. To utilize the principle of flotation to partially support the weight of the rotary element of the commutator mechanism, and in so doing to alleviate the end thrust of the armature shaft of the synchronous motor.

XI. To improve the mechanical structure of the commutator mechanism and to simplify the electrical arrangement of the parts thereof.

XII. To render positive the make and break of the contact mechanism forming a part of the commutator structure.

Other objects and purposes of the invention are pointed out below, in the detailed description of my device.

Reference is made to the accompanying drawing, forming a part of this specification, and in which like letters indicate like parts throughout the several figures.

Figure 1:
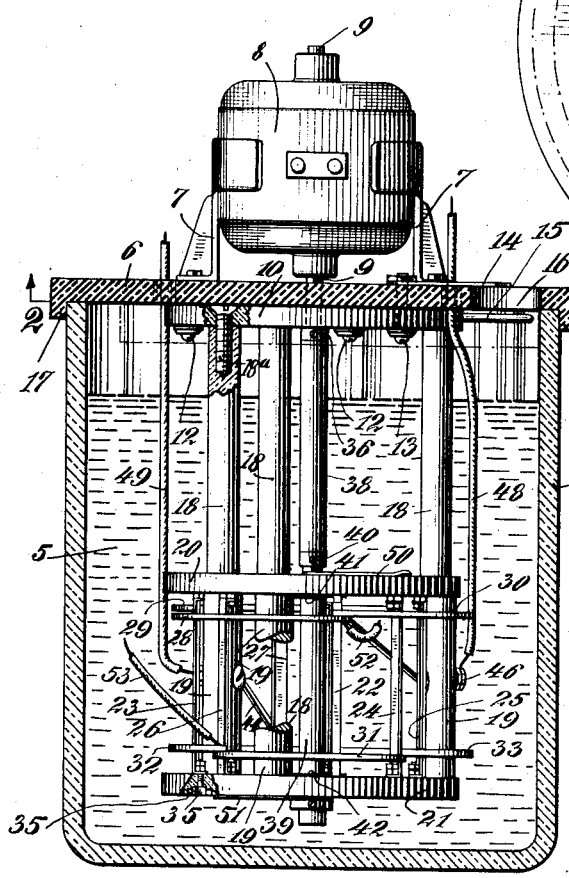
Figure 1 is a substantially central vertical section through my device.

A tank 4, having in this instance the form of a jar, but which may have any other form desired, contains a volume of oil 5, serving as an insulating liquid.

Fitted upon the top of the tank is a cover 6, made of insulating material such as hard rubber, and serving to support all of the working parts.

Mounted securely upon the top surface of the cover 6 are a pair of brackets 7, and supported upon these brackets is a synchronous motor 8, having any desired number of poles, preferably six or eight.

The motor 8 is provided with an armature shaft 9, which extends vertically downward through a hole in the center of the cover 6. The shaft also extends loosely through a hole in the center of a disk 10, which loosely engages the bottom surface of the cover.

Figure 2:
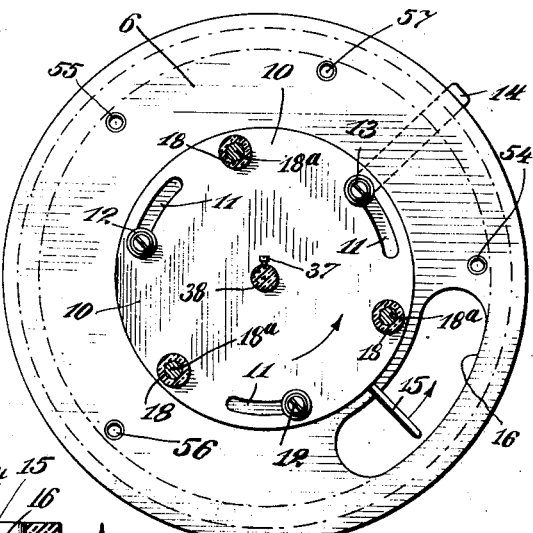
Fig. 2 is a section on the line 2—2 of Fig. 1, looking in the direction indicated by the arrows.

The disk 10 is provided with arcuate slots 11, in this instance three in number. Extending through these slots and through corresponding holes in the cover 6 are two screws 12 and a screw bolt 13. Fitted upon the upper or free end of the screw bolt 13 is a locking arm 14. By turning this arm slightly upon the screw bolt 13 as a center the adjacent portion of the disk 10 may be jammed against the under side of the cover 6, and the disk 13 thus locked fixedly in relation to the cover. By turning the locking arm 14 slightly in the opposite direction, however, the disk 10 is loosened and thus left free to turn, within certain limits, relatively to the cover. The distances the disk can thus be turned relatively to the cover 6 are determined by the lengths of the arcuate slots 11, as may be seen from Fig. 2.

In order to facilitate the turning of the disk 10 I provide it with a pin 15, projecting radially outward from its edge. To facilitate access to this pin I provide an arcuate slot 16 in the cover 6. The operator, by placing his fingers in the slot 16, can grasp the pin 14 and by its aid can turn within measured limits, the disk 10 and all parts carried thereby, as indicated by arrows in Fig. 2. The pin 15 thus serves as a handle for this purpose.

The cover 6 is centered and held in position by a flange 17, which overhangs the top edge of the jar 4.

Secured rigidly to the disk 10 and extending downwardly therefrom are lengthy supporting rods 18, three in number, spaced equidistant. Each of these supporting rods is provided with an enlarged portion 19—that is, having a diameter a little greater than that of the upper portion.

The supporting rods 18 together carry two disks 20 and 21, made of hard rubber or other appropriate insulating material. The disk 21 is secured firmly upon the lower ends of the supporting rods, and is parallel to the disk 20.

Figure 3:
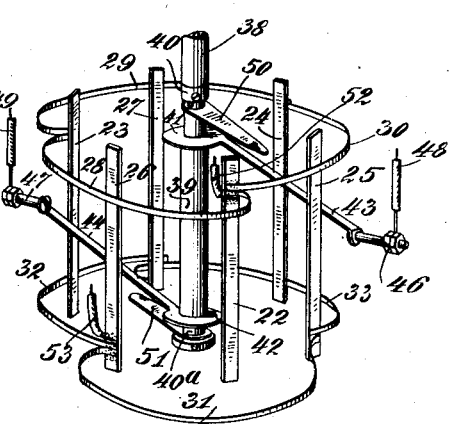
Fig. 3 is a diagrammatic perspective of the commutator mechanism.
Figure 4:
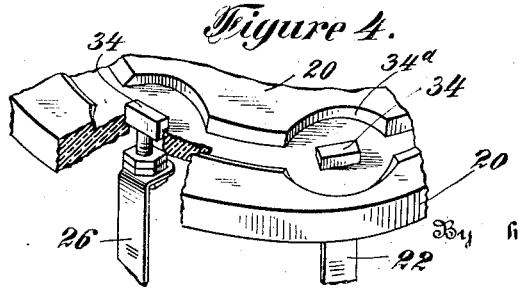
Fig. 4 is a fragmentary perspective of a part of the contact mechanism.

I provide a number of commutator bars 22, 23, 24, 25, 26, 27, in this particular instance six in number. These commutator bars are made of hard, durable, conducting material, preferably copper. They are disposed parallel to each other, and are spaced equidistant. They are arranged in two distinct groups, as may be understood from Fig. 3. One group consists of the bars 22, 23 and 24. These are connected together by metallic bonds 28, 29, 30, secured to them by soldering. The other group consists of the bars 25, 26, 27, similarly connected together by metallic bonds 31, 32, 33. Each commutator bar is at its ends provided with contact buttons 34, 35, located respectively in channels 34ª, 35ª.

The armature shaft 9 carries a coupling 36 having a set screw 37, and secured to this coupling is a shaft section 38 made of hard insulating material. Below this shaft section is another shaft section 39, also of insulating material. A metallic sleeve 40 connects these two shaft sections, and extends through the disk 20, which thus serves as a bearing. The shaft sections 38 and 39 are thus to all intents and purposes a prolongation of the armature shaft 9. The shaft section 39 carries at its lower end a metallic sleeve 40ª, which extends through a hole in the disk 21.

Encircling the two sleeves 40 and 40ª, respectively, are two annular metallic brushes 41, 42. These annular brushes are carried respectively by metallic strips 43, 44, extending from the respective binding posts 46, 47. Connected with these binding posts are wires 48, 49. These are high tension terminals, and are adapted to be connected to the secondary winding of a transformer, not shown.

The metallic sleeve 40 carries a commutator arm 50, secured rigidly upon it and having generally the form of a thin blade. A similar commutator arm 51 is mounted rigidly upon the metallic sleeve 40ª. By this arrangement the arm 50 is always in direct contact with the strip 43, and the arm 51 is in direct contact with the strip 44.

A terminal wire 52 is secured to the commutator bar 22, and hence is at all times in metallic communication with the commutator bars 23 and 25, through the medium of the bonds 28, 29, 30. Similarly another terminal wire 53 is secured to the commutator bar 26, and through the bonds 31, 32, 33 is at all times in metallic communication with the commutator bars 25 and 27.

The two terminal wires 52 and 53 are to be connected to the instrument or external circuit through which the rectified currents are to be sent. This may be an X-ray tube, not shown. The wires 48, 49, 52 and 53 are led out through holes 54, 55, 56, 57, in the cover 6, these holes being located at any convenient points.

The commutator mechanism is so arranged that whenever one of the arms 50 or 51 is in direct metallic communication with one commutator bar of a group, the other one of these arms is in direct metallic communication with another commutator bar of the other group. For instance, whenever the arm 50 is over the bar 22 and thus in direct metallic communication with the group of bars 22, 23 and 24, the arm 51 is necessarily under the bar 27, and so in direct metallic communication with the group of bars 25, 26, and 27. Hence electrically speaking, the two groups of commutator bars are always energized simultaneously and in opposite senses, and the two groups are never in communication with each other except through the medium of the terminal wires leading out through the holes in the cover.

The synchronous motor is so arranged that whenever its armature is momentarily in such position that the switch arm 50 is directly over a commutator bar of one group, as above stated, for instance over the bar 22 of the group 22, 23, 24, the alternating current to be rectified is for the moment flowing in a definite direction; and whenever the armature is momentarily in such position that the switch arm 50 is directly over a commutator bar of the opposite group, say over the bar 25 of the group 25, 26, 27, the alternating current to be rectified is momentarily flowing in a direction contrary to the one just mentioned. Thus the current operated upon by the commutator mechanism as a whole is always caused to flow in a unitary direction.

It will be noted that the member 6 serves a number of distinct purposes. First, it is a cover for the oil tank. Second, it is a support for the synchronous motor. Third, it is a support for the commutator mechanism, which as a whole hangs from it into the oil tank. The motor and commutator shaft are thus upon opposite faces of the cover and extend in opposite directions. As the general axis of rotation of the various revoluble parts as a whole is vertical, there is developed a minimum of friction and the movable parts are mostly in balance at all times. Hence, less power being required to actuate the revoluble parts, a relatively small motor can be used.

My purpose in giving each commutator arm 50, 51 the form of a thin blade is to enable it to cut its way easily through the insulating liquid, and thus develop a minimum of friction. Thus a saving is effected in the power consumed in forcing the switch arms through the liquid.

Each part which, while in action, rotates continuously in the insulating liquid is given such form and so located that a further saving of power is effected by a reduction of the friction otherwise developed by movement of the part through the liquid.

The saving of power enables the sizes of the various working parts to be reduced, and this in turn enables a comparatively small motor to be used for actuating the working parts.

I find that with the construction of rectifying mechanism above described, and by using a synchronous motor of six or eight poles, the speed of rotation in the rectifying switch may be considerably reduced. Ordinarily in the past the speed of the shaft of the rectifying switch has been 1800 revolutions per minute for a current of 60 cycles per second or 3600 per minute. With my present invention the speed of the rectifying switch may, for the current frequency just mentioned, be reduced to 1200 or even to 900 revolutions per minute. I have also discovered that at either of the two speeds last mentioned, the action of the rectifying switch in oil is not only practicable, but in every way satisfactory.

It will be noted that the contact buttons 34, 35 are each partly embedded in insulating material, and that each contact button, by extending into the adjacent channel, 34ª or 35ª, is completely surrounded by the oil. Owing to this arrangement, the engagement of the arms 50 and 51 with the contact buttons is of such character that the insulation of the oil is attained positively. When the commutator arms move off of the buttons which they engage, the break necessarily takes place altogether in oil. There is no chance for a make-and-break contact to take place except positively and abruptly.

In order that the commutator mechanism may be maintained in exact phase to pick out the current peaks of highest potential, the operator can correct the phase of the commutator mechanism from time to time by adjusting the disk 10 by means of the handle pin 15, serving as a handle as above described. For this purpose the disk 10 is first unlocked by a movement of the locking arm 14, the proper adjustment of the disk 10 is effected, and then by another movement of the locking arm 14 the disk is locked rigidly in position.

I do not limit myself to the precise arrangement shown, as variations may be made therein without departing from the spirit of my invention.

I claim:—

1. In a high tension rotary rectifier the combination of a disk made of insulating material and provided with a channel having a general annular form, a plurality of contact buttons each partially embedded in said disk and extending into said channel to an appreciable distance from the bottom thereof, a revoluble contact member journaled to turn relatively to said disk, and so disposed as to make and break contact with each contact button, and means for normally maintaining said disk, said contact buttons and said revoluble contact member submerged in a liquid insulating medium.

2. In a device of the character described the combination of an oil tank, a cover fitted thereupon, a synchronous motor supported by said cover, a supporting disk mounted upon said cover, a frame carried by said supporting disk and depending therefrom into said oil tank, contacts carried by said frame, a revoluble arm driven by said motor for the purpose of engaging and disengaging said contacts in a predetermined phase relation, and mechanism controllable at the will of the operator for turning said supporting disk to different angles relatively to said motor, in order to adjust the phase.

3. In a rotary rectifier, the combination, with a tank for holding a liquid insulating material, of a rectifying switch having a contact arm and a plurality of contact buttons located within said tank and submerged in said liquid insulating material, said contact arm being revoluble in order to engage and disengage said contact buttons and consisting of a thin blade, movable edgewise, through said liquid insulating material in order to encounter a minimum of resistance therefrom.

4. In a rotary rectifier, the combination, with a synchronous motor and a tank for holding a liquid insulating material, of a rectifying switch connected with said motor and driven thereby, said switch having a revoluble contact arm and a plurality of contact buttons located within said tank and submerged in said liquid insulating material, said contact arm having the general form of a thin blade and being revoluble edgewise through said insulating material in order to reduce to a minimum the resistance applied by said insulating material to the rotation of said contact arm.

5. In a rotary rectifier, the combination, with a tank for holding a liquid insulating material, of a rectifying switch located within said tank and having a plurality of contact buttons and a contact arm submerged in said liquid insulating material, said contact arm being a thin blade mounted to move edgewise through said liquid insulating material and each of said contact buttons having a projecting contact face which is at all times closely encircled by said liquid insulating material.

6. In a high tension rotary rectifier, the combination of a disk made of insulating material and provided with a channel, a plurality of contact buttons each partially embedded in said disk and extending into said channel to an appreciable distance from the bottom thereof, a revoluble contact arm journaled to turn relatively to said disk and having the form of a thin blade movable edgewise and so disposed as to make and break contact with each contact button, and means for normally maintaining said disk, said contact buttons and said revoluble contact arm submerged in a liquid insulating material.

7. The combination of an oil receptacle for holding insulating oil, a closure member for said receptacle, a synchronous motor mounted upon said closure member and provided with an armature shaft extending therethrough, and a high tension rotary rectifying switch disposed within said receptacle and having a framework and a group of rotating parts, said framework being mounted upon said cover, said group of rotating parts being connected with said armature shaft and driven by said motor, and means controllable at the will of the operator for turning said framework slightly in relation to said cover in order to adjust the group of rotating parts relatively to the current phase.

8. The combination of a receptacle containing a volume of insulating liquid, a closure member for said receptacle, an electric motor secured to said closure member and provided with a revoluble shaft extending through said closure member, and a high tension rectifying switch located within said receptacle, said rectifying switch comprising a frame supported by said closure member and a revoluble element carried by said armature shaft, said frame and said revoluble element being submerged in said liquid, and said frame being movable to a limited extent relatively to said closure member, in order to adjust said rectifying switch to the current phase.

9. In a high tension rotary rectifier, the combination of a disk made of insulating material and provided with a channel having a general annular form, a plurality of contact buttons each partially embedded in said disk and extending into said channel to an appreciable distance from the bottom thereof, a revoluble contact member journaled to turn relatively to said disk and so disposed as to make and break contact with each contact button, and means for maintaining said disk, said contact buttons and said revoluble contact member submerged in a liquid insulating material, said revoluble contact member having the form of a thin blade and being movable edgewise through said liquid insulating material.

REINHOLD H. WAPPLER.